United States Patent [19]

Scheid

[11] Patent Number: 4,970,398

[45] Date of Patent: Nov. 13, 1990

[54] FOCUSED MULTIELEMENT DETECTOR FOR X-RAY EXPOSURE CONTROL

[75] Inventor: Carl C. Scheid, Delafield, Wis.

[73] Assignee: General Electric Company, Milwaukee, Wis.

[21] Appl. No.: 361,988

[22] Filed: Jun. 5, 1989

[51] Int. Cl.[5] ......................... G01T 1/00; G01T 1/185; H01J 47/02

[52] U.S. Cl. ................................ 250/374; 250/354.1; 250/385.1; 250/389; 250/396 R

[58] Field of Search ...................... 250/354.1, 374, 375, 250/385.1, 386, 389, 396 R; 278/37, 19

[56] References Cited

U.S. PATENT DOCUMENTS

| | | | |
|---|---|---|---|
| 2,953,702 | 9/1960 | Zieler | 315/93 |
| 3,770,960 | 11/1973 | Webster | 250/385.1 |
| 3,975,638 | 8/1976 | Grunberg et al. | 250/385.1 |
| 3,991,312 | 11/1976 | Whetten et al. | 250/385.1 |
| 4,230,944 | 10/1980 | Wiegman et al. | 378/97 |
| 4,376,893 | 3/1983 | Whetten | 250/374 |
| 4,535,245 | 8/1985 | Zonneveld et al. | 250/385.1 |
| 4,686,369 | 8/1987 | McDaniel et al. | 250/385.1 |
| 4,707,608 | 11/1987 | DiBianca | 250/389 |
| 4,764,679 | 8/1988 | McDaniel et al. | 250/374 |

*Primary Examiner*—Constantine Hannaher
*Assistant Examiner*—Edward J. Glick
*Attorney, Agent, or Firm*—Quarles & Brady

[57] ABSTRACT

A multi-zoned x-ray exposure detector for a scanning fan beam x-ray system comprises an electron emitter which upon exposure to x-rays emits electrons into a channel defined by an isolation walls. The channel contains air which is ionized. The isolation walls extend parallel to the direction of the sweeping fan beam behind the electron emitter. Within each channel formed by the isolation walls, is a collection electrode biased in voltage with respect to the electron emitter to collect the ions. The intersection of the beam and the channel defines a zone in which exposure may be determined.

The current from the collection electrode is amplified by an amplifier to produce a signal related to x-ray exposure of each zone.

5 Claims, 3 Drawing Sheets

FIG. 4
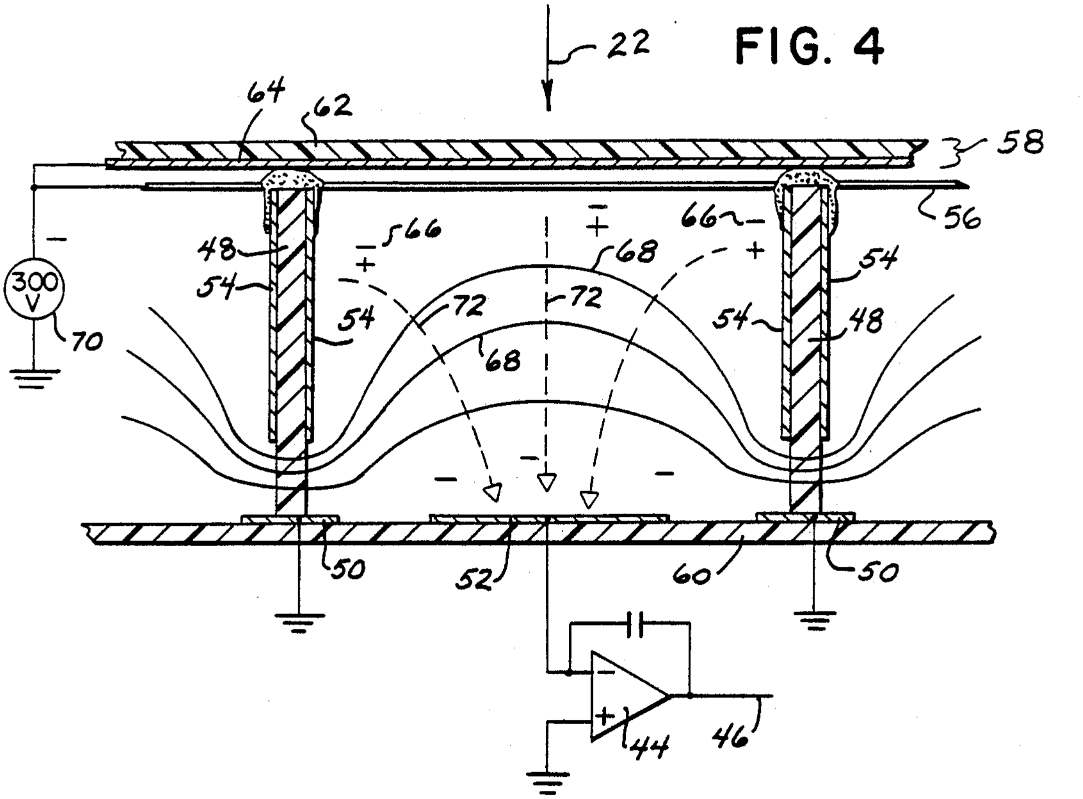
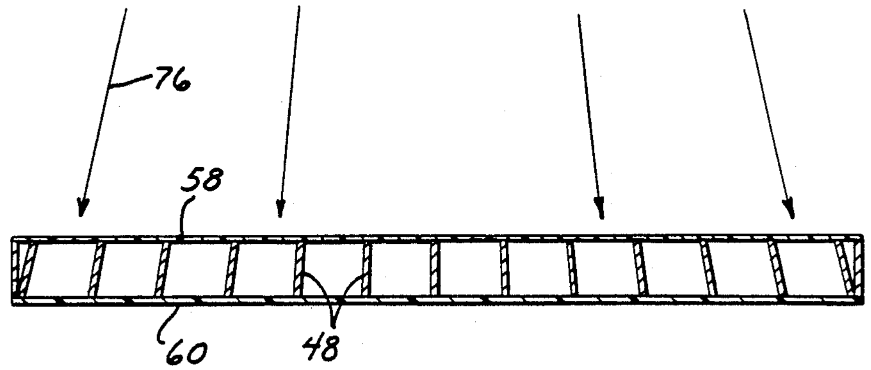
FIG. 5

FOCUSED MULTIELEMENT DETECTOR FOR X-RAY EXPOSURE CONTROL

BACKGROUND OF THE INVENTION

This invention relates to an x-ray detector for use in automatic exposure control in x-ray equipment, and in particular to an x-ray detector for use in scanning beam x-ray radiographic equipment.

Control of the exposure of x-ray film, or of other x-ray sensitive media, is necessary to obtain the maximum diagnostic information from the recorded x-ray image. The limited exposure range of most such media causes a loss of image detail, as conveyed in the contrast of the image, if the media is underexposed or overexposed. Overexposure of the media will reduce the contrast of imaged body structures that are relatively transparent to x-rays. Underexposure will reduce the contrast of imaged body structures that are relatively opaque to x-rays Accurate exposure is particularly important in the imaging of soft tissue, as in applications such as mammography, where the differences of x-ray absorption between different tissue is low and where the thickness of the tissue and therefore the amount of x-rays transmitted by the tissue varies substantially over the image area.

Recording several images at different x-ray exposures is often required to obtain the correct exposure. The drawback to this approach is that it requires that the patient be exposed to additional x-ray radiation and it requires additional time and expense. Alternatively, the contrast of the image may be reduced by adjusting the KVP of the x-ray tube so as to allow more exposure latitude. This approach, however, reduces the ability of the diagnostician to detect low contrast objects.

In a conventional "area beam" x-ray apparatus, the exposure may be controlled by changing the exposure time. The exposure over the entire image area is uniform and therefore automatic exposure control is possible with the use of small area ionization-type or semiconductor x-ray detectors. Such detectors are centered within the image area to read the x-ray exposure within the detector's area to control the exposure of the entire area beam.

More recent, scanning x-ray systems, such as "fan beam" and "flying spot" systems which sweep the area of the imaged object with a narrowed x-ray beam, permit exposure to be varied for different parts or within different zones of the image. Implementation of automatic exposure control in such systems requires an x-ray detection system that can provide exposure readings for individual zones over the entire image area.

SUMMARY OF THE INVENTION

In the ionization detector of the present invention, an x-ray beam strikes an electron emitter which generates high energy electrons in a zone defined by the x-ray beam and an isolation wall extending parallel to the beam and behind the electron emitter. The electrons ionize the gas contained within the zone. A collection electrode within the channel is biased in voltage with respect to the electron emitter to collect the ions. The charge collected is amplified by a amplifier to produce a signal related to x-ray exposure It is one object of the invention to produce an x-ray exposure detector suitable for scanning fan beam x-ray systems that may provide independent x-ray exposure readings for a large number of zones over the surface of an image area. The intersection of the fan beam exposure area and the detector channels defines a row of independently measurable exposure zones. As the fan beam is swept across the exposure detector, the exposure received by additional distinct zones may be measured.

It is another object of the invention to produce an exposure detector of increased sensitivity. The electron emitter, the isolation walls, and the collection electrode are all constructed of high atomic number materials (high z materials) to increase the number of high energy electrons and hence the ionization produced by a given x-ray beam. The electron emitter and isolation walls are given a voltage bias with respect to the collection electrode to create an electrostatic lens within the zone defined by the isolation wall directing the x-ray generated ions toward the collection electrode to further increase the detector's sensitivity.

A further object of the invention is to produce a multi-zoned exposure detector where the sensitivity of the zones may be readily matched The sensitivity of each zone is primarily a function of the size and physical placement of the electron emitter, the isolation walls and the collection electrode. The size and placement of these elements may be accurately controlled in manufacturing. The isolation walls are slanted near the edges of the detector so as to be aligned with the x-ray beam, thereby preventing the isolation walls from shadowing the ionization zone.

Another object of the invention is to produce an exposure detector where the relationship between exposure signal and x-ray tube voltage (KvP) may be varied to provide a desired film density as a function of KVP in an x-ray system with automatic exposure control. The electron emitter is produced by depositing a thin layer of high z material on a low z substrate. It has been found that adjusting the thickness and composition of this high z layer markedly affects the relationship between x-ray KVP and detector current. Varying the thickness and composition of the high z layer therefore allows adjustment of the relationship between film density and KVP in an x-ray system with automatic exposure control.

The foregoing and other objects and advantages of the invention will appear from the following description In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 4 is a sectional view of the exposure detector along line 4—4 of FIG. 1 showing the electrical connections to the exposure detector elements and the electrostatic field lines within the exposure detector;

FIG. 5 is a simplified sectional view along line 4—4 of FIG. 1 showing the orientations of the isolation walls of the exposure detector of FIG. 1 as a function of transverse position.

DESCRIPTION OF THE PREFERRED EMBODIMENT

The system to be described in this section is adapted for use in mammography and other applications involving the imaging of soft tissue, however the invention is not limited to use with mammography systems.

Figure 1:
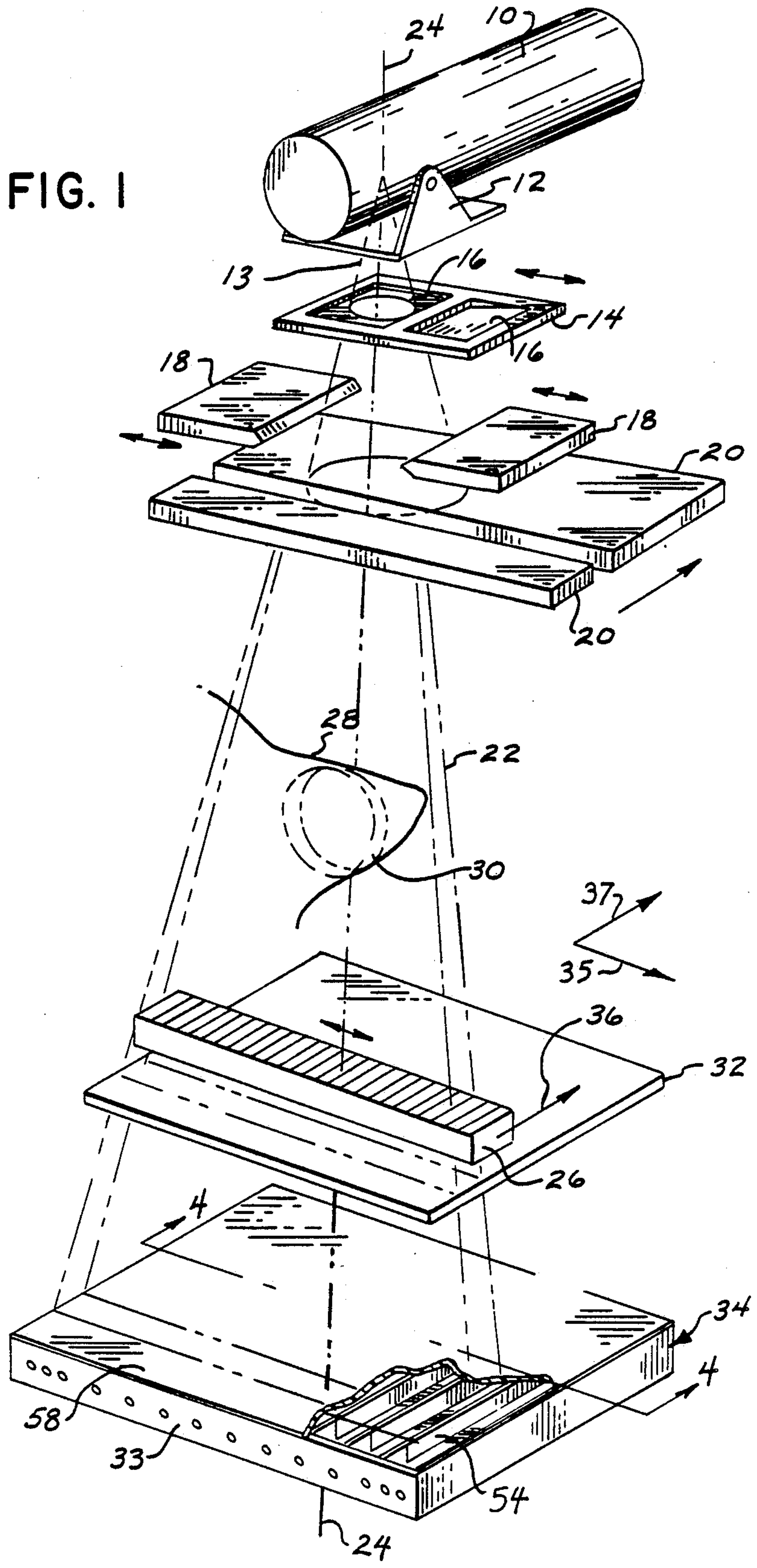
FIG. 1 is a simplified and exploded perspective view of a fan beam x-ray radiograph apparatus showing the relative location of the exposure detector.

Referring to FIG. 1, a radiographic system incorporating the present invention includes an x-ray tube 10 directed so as to project a beam of x-rays 13 through soft tissue 28 toward x-ray sensitive medium 32.

The x-ray beam diverges equally about a major axis 24. X-ray tube 10 may be tipped on tube pivot 12 to sweep the major axis 24 in a longitudinal direction 37 as will be described further below.

A filter rack 14 mounted to slide transversely through the x-ray beam 13 carries filters 16 to attenuate the x-ray beam as is understood in the art.

The filtered x-ray beam passes through the beam length shutters 18 and beam sweep shutters 20 which form the x-rays into a fan beam 22. The beam length shutters 18 are independently adjustable in a transverse direction 35 to control the x-ray fan beam's transverse dimension or length. The ends of the beam length shutters 18, extending into the x-ray beam 13, are tapered to provide a gradual attenuation of the x-ray beam at its transversely opposed edges. The beam sweep shutters 20 which define a transverse slit, control the x-ray beam's longitudinal dimension or thickness. The beam sweep shutters 20 move together in a longitudinal direction 37 to follow the grid 26, described below and the axis 24 of the x-ray beam when the x-ray tube 10 is tipped. The tipping of the x-ray tube 10 and the motion of the beam sweep shutters 20 in tandem thereby sweeps the fan beam 22 along the longitudinal axis 37.

The fan beam 22 projects through a slice 30 of the imaged soft tissue body 28 and is focused by grid 26 to project an image of slice 30 on x ray sensitive medium 32. The attenuated fan beam 22 passes through the x-ray sensitive medium 32 and is detected by exposure detector 34 as will be described below.

As the fan beam 22 progresses longitudinally across the imaged soft tissue body 28 and across the surface of the x-ray sensitive medium 32, a continuous projection of the imaged body 28 is formed. The grid 26 moves longitudinally across the image area of the x-ray sensitive medium 32 to follow the sweeping fan beam 22 and simultaneously reciprocates transversely to reduce the formation of grid lines on the x-ray sensitive medium 32. The operation of the grid is described in co-pending application entitled: "Method and Apparatus for Reducing X-ray Grid Images" filed on even date herewith and given Ser. No. 07/361,989 filed June 5, 1989.

Figure 2:
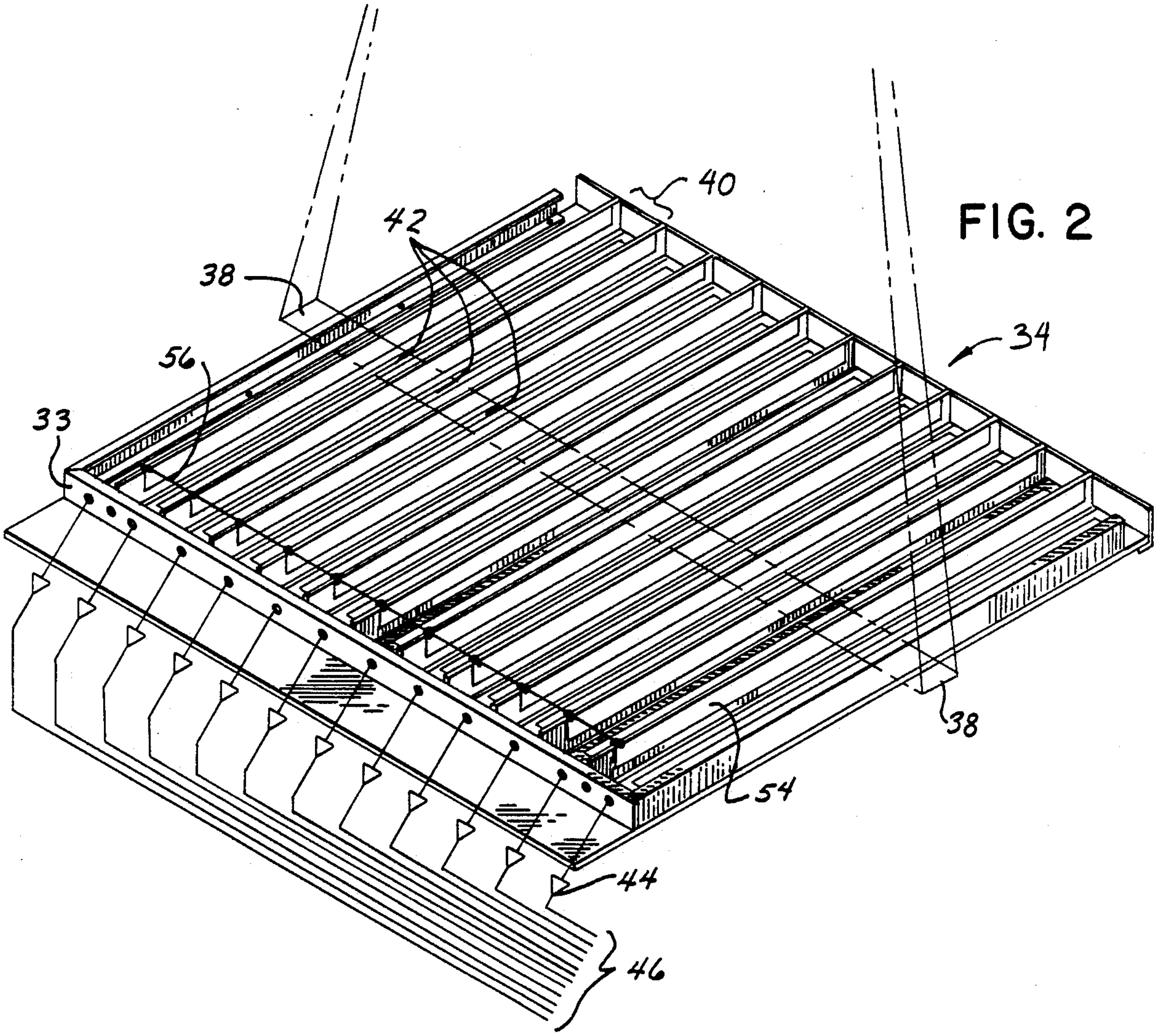
FIG. 2 is a schematic representation of the exposure detector of FIG. 1 showing the orientation of the fan beam with respect to the exposure detector channels and the resultant creation of a row of detection zones.

Referring to FIG. 2, the exposure detector 34 is comprised of a series of longitudinal detector channels 40 organized in parallel rows over the image area. Each detector channel 40 is connected to an amplifier 44 which provides a signal at lead 46 indicating the total exposure received along the entire length of the detector channel 40. At any given time in the sweep of the fan beam 22, the the exposure area 38 of the fan beam cuts perpendicularly across the detector channels 40 to expose only a portion of each detector channel 40. At each instant in time, therefore, the detector channel 40 provides an instantaneous reading of exposure at a zone 42 formed by the intersection of the detector channel 40 and the fan beam exposure area 38. The present exposure detector 34, used with a fan beam system, can thus provide exposure measurements of a number of zones within the image area rather than merely along the length of the detector channels.

The ability to make exposure measurement at each zone 42 permits the exposure of each zone 42 to be varied. Specifically, the beam length shutters 18 may be controlled to attenuate the fan beam at the edge zones 42 as the beam sweeps across the image area. This feature may be used to automatically mask the soft tissue body 28, and to correct the exposure near the thinner edges of the body 28. In addition, the voltage of the x-ray tube 10 may be controlled as a function of the exposure measurement to permit correction of exposure variations resulting from changes in the thickness of the soft tissue body 28 along the direction of the fan beam scan 36.

Figure 3:
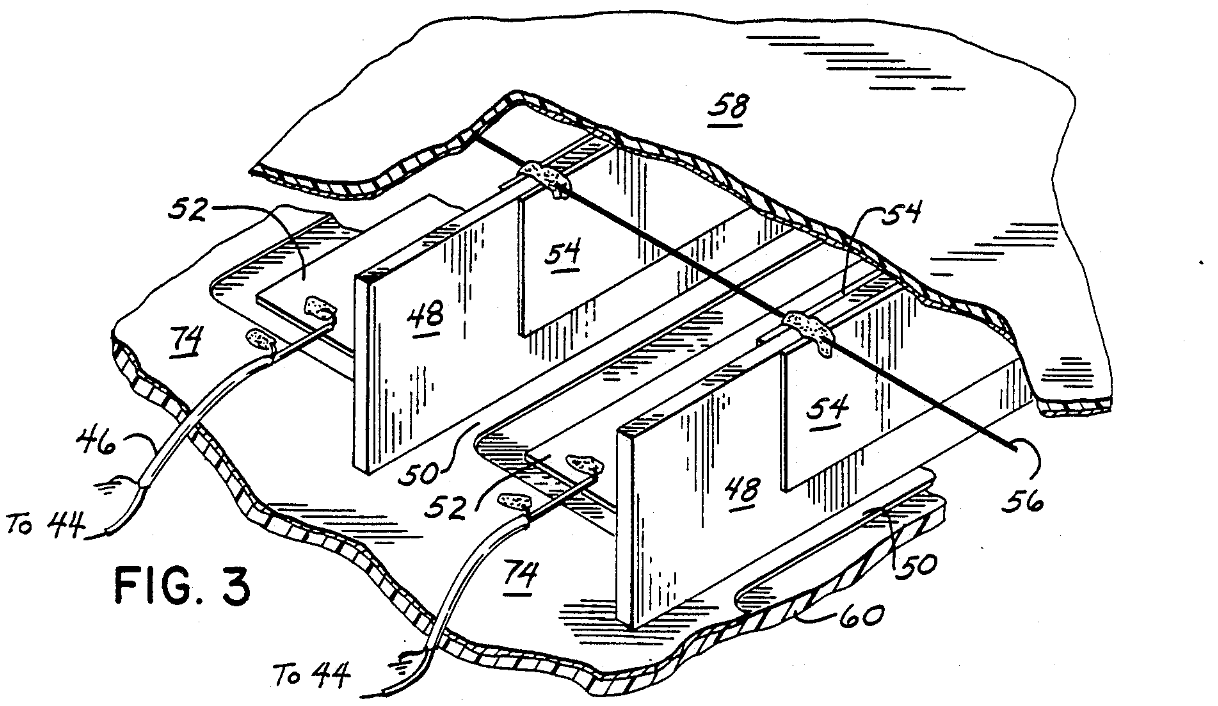
FIG. 3 is a perspective view in the longitudinal direction of the exposure detector of FIG. 1 with an endplate removed and part of the electron emitter cut away.

Referring to FIGS. 3 and 4, the upper surface of the exposure detector 34 is covered by an electron emitter 58 which receives the x-rays from the fan beam 22 transmitted by the x-ray sensitive medium 32. Electron emitter 58 is comprise of a low z plastic support layer 62 coated, on its lower surface, with with a high z layer of lead 64 which maybe varied in thickness between approximately 0.1 and 10 mg/cm$^2$ depending on the compensation desired, as will be discussed below. It will be apparent to one skilled in the art that materials other than lead may be substituted for the lead coating 64 in this application. The material must have a high z and be capable of being applied in a thin layer: copper or iron, for example, could be used.

X-rays from the fan beam 22 strike the lead coating 64 which emits high energy electrons into the air filled volume beneath the electron emitter 58. The high energy electrons strike the air molecules producing ions 66. Supporting the electron emitter 58 are isolation walls 48 defining the boundaries of each detector channel 40. The isolation walls 48 are constructed of fiberglass impregnated epoxy resin and serve to prevent movement of the ions 66 between detector channels 40. On the transverse faces of the isolation walls 48 are tin plated copper focussing electrodes 54 so as to provide that each detector channel 40 is flanked by two focussing electrodes 54 running the length of the channel 40.

The isolation walls 48 are affixed to tin plated copper guard pads 50, attached in turn to the detector base 60, which is positioned beneath, but parallel to, the electron emitter 58. A tin plated copper collection electrode 52 is positioned between the guard pads 50.

Referring to FIG. 4, the electron emitter 58 and the focussing electrodes 54 are biased to a negative voltage of 300 volts with reference to the collection electrode 52 (defined as ground potential) by voltage source 70. The negative terminal of voltage source 70 is connected to the electron emitter 58 and the focussing electrodes 54 by high voltage feed wire 56. The positive terminal of voltage source 70 is connected to the guard pads 50 by means of connecting trace 74 (shown in FIG. 4). The collection electrode 52 is referenced to ground through the amplifier 44. The effect of these potentials is to create an electrostatic lens, formed by electrostatic field 68, that directs the negative ions 66 along paths 72 to the collection electrode 52 throughout most of the volume of the detector channel 40 increasing the detection efficiency by directing ions 66 to the collection electrode 52 rather than the ground guard pads 50, and reducing cross talk between channels 40 that might result from ions 66 drifting between such channels. It should be noted that the selection of the polarity of the voltage source 70 is arbitrary and that its polarity may be switched so that the opposite polarity of ions are collected by the collection electrode 52, and the signal generated by the amplifier 44 is of the opposite polarity The high energy electrons produced by the fan beam 22 striking the electron emitter 58, the focussing electrodes 4, and the collection electrodes 52 generate ions 66 which are thus collected by the collection electrode 52 and conducted to the input of the amplifier 44 which integrates and amplifies this charge to provide a signal indicating total exposure for that detector channel 40.

The variation in sensitivity between an exposure detector and that of the x-ray sensitive medium, under changes in x-ray KVP, typically requires compensation of the detector signal as a function of KVP. With the exposure detector 34 positioned after the x-ray sensitive medium 32, the exposure detector 34 becomes more sensitive to x-rays, with comparison to the x-ray sensitive medium 32, as KVP is raised. Reducing the thickness of the lead coating 64 on the electron emitter 58 minimizes this effect to permit direct exposure control by the exposure detector signal without compensation, for certain applications. This effect may be reversed, if required for other applications, by increasing the thickness of the high z layer on the electron emitter 58. Alternatively, a material with a higher or lower z than lead may be substituted for the lead coating to produce the same effect as using a thicker or thinner layer of lead respectively.

The guard pads 50 serve to collect leakage current traveling from the focussing electrodes and the electron emitter down the isolation walls 48 that would interfere with the exposure measurement.

Referring to FIG. 5, the isolation walls 48 are canted slightly at each end of the exposure area 38 to align better with the angled rays of the fan beam 22. This orientation reduces shadowing effects by the focussing electrodes 54 on the ionization zone and thereby provides greater uniformity between detector channels 40 and greater sensitivity to the edge detector channels 40

A preferred embodiment of the invention has been described, but it should be apparent to those skilled in the art that many variations can be made without departing from the spirit of the invention. For example, the spacing and orientation of the channels may be adjusted to accommodate other x-ray scanning systems.

I claim:

1. An x-ray detector for a fan beam x-ray apparatus having an x-ray fan beam centered in a beam plane about a major axis to move in a sweep direction within an image area and perpendicular to said beam plane, comprising:

a primary planar electron emitter means for receiving the x-ray fan beam and generating electrons in response to excitation by x-ray radiation from the fan beam;

an ionization means positioned behind the primary planar electron emitter means with respect to the path of the x-ray radiation and responsive to the electrons for generating ions;

an isolation wall extending away from the primary planar electron emitter means within the ionization means and running parallel to the beam sweep direction over the length of the image area and positioned behind the primary target means with respect to the path of the x-ray radiation for segregating ions into a first and a second zone within the image area;

a collection electrode within each zone and generally parallel to the primary planar electron emitter;

a biasing means for applying a first voltage to the primary electron emitter with respect to the collection electrode to attract ions to the collection electrode for collection thereby; and an amplifier means for producing a signal related to the electric charge collected by the collection electrode.

2. The x-ray detector means of claim 1 wherein the biasing means applies a second voltage to the isolation wall for creating an electrostatic lens.

3. The x-ray detector means of claim 1 wherein the isolation wall means includes a secondary electron emitter means for generating electrons in response to excitation by x-ray radiation.

4. An x-ray detector for a scanning x-ray apparatus having an x-ray fan beam centered in a beam plane about a major axis to move in a sweep direction perpendicular to said beam plane so that the fan beam x-ray sweeps an image area, the detector comprising a plurality of elongate detector channels oriented along parallel rows across the image area with the rows aligned with the direction of the sweeping x-ray beam, each channel comprising:

a primary electron emitter means for generating electrons in response to excitation by x-ray radiation;

an ionization means responsive to the electrons for generating ions;

an isolation wall extending away from the primary electron emitter means and positioned behind the primary electron emitter means for segregating ions into a zone;

a collection electrode within the zone;

a biasing means for applying a first voltage to the primary electron emitter means with respect to the collection electrode to attract ions to the collection electrode for collection thereby; and an amplifier means for producing a signal related to the electric charge collected by the collection electrode.

5. The x-ray detector means of claim 4 wherein the isolation wall extends away from the primary electron emitter in a direction parallel to the rays of the fan beam.

* * * * *